United States Patent [19]

Wohl et al.

[11] Patent Number: 5,247,700
[45] Date of Patent: Sep. 21, 1993

[54] CELLULAR TELEPHONE WITH PAGER

[75] Inventors: James P. Wohl, Beverly Hills; W. Edward Naugler, Jr., Seal Beach; James Hendershot, Arroyo Grande; Graham P. Lloyd, Fremont; Erich B. Adams, Riverside, all of Calif.

[73] Assignee: Universal Cellular, Inc., Anaheim, Calif.

[21] Appl. No.: 614,302

[22] Filed: Nov. 16, 1990

[51] Int. Cl.⁵ .................................... H04Q 7/00
[52] U.S. Cl. .................. 455/33.1; 455/180.2; 455/228; 340/825.44
[58] Field of Search .............. 455/32.1, 33.1, 38.1, 455/38.4, 54.1, 89, 180.1, 180.2, 189.1, 190.1, 196.1, 228, 258, 349, 351; 340/825.44; 379/58, 59, 60

[56] References Cited

U.S. PATENT DOCUMENTS

| | | | |
|---|---|---|---|
| 3,575,558 | 4/1971 | Leyburn et al. | 179/41 |
| 3,641,276 | 2/1972 | Keller | 179/18 BF |
| 3,714,375 | 1/1973 | Stover | 325/40 |
| 3,818,145 | 6/1974 | Hanway | 179/41 A |
| 3,836,726 | 9/1974 | Wells | 179/41 A |
| 3,902,022 | 8/1975 | Breeden | 179/41 A |
| 4,013,958 | 3/1977 | Spayth | 325/55 |
| 4,072,824 | 2/1978 | Phillips | 179/18 B |
| 4,149,125 | 4/1979 | Ikeguchi | 331/1 A |
| 4,178,475 | 12/1979 | Taylor et al. | 179/2 EC |
| 4,178,476 | 12/1979 | Frost | 179/2 EC |
| 4,180,776 | 12/1979 | Lindemann | 325/25 |
| 4,249,165 | 2/1981 | Mori | 340/311 |
| 4,273,962 | 6/1981 | Wolfe | 179/71 R |
| 4,276,654 | 6/1981 | Nations et al. | 455/160 |
| 4,280,104 | 7/1981 | Rzeszewski | 331/1 A |
| 4,303,893 | 12/1981 | Goldberg | 331/1 A |
| 4,314,208 | 2/1982 | Munday | 331/1 A |
| 4,383,257 | 5/1983 | Giallanza | 340/825.47 |
| 4,388,596 | 6/1983 | Yamashita | 331/1 A |
| 4,392,135 | 7/1983 | Ohyagi | 340/825.44 |
| 4,397,037 | 8/1983 | Theriault | 455/293 |

(List continued on next page.)

FOREIGN PATENT DOCUMENTS

| | | |
|---|---|---|
| 0124788 | 11/1984 | European Pat. Off. . |
| 0145171 | 6/1985 | European Pat. Off. . |
| 0263666 | 4/1988 | European Pat. Off. ............ 379/57 |
| 197059 | 11/1983 | New Zealand . |
| 8201268 | 4/1982 | PCT Int'l Appl. . |
| 8806830 | 9/1988 | PCT Int'l Appl. . |

OTHER PUBLICATIONS

H610, Focarice et al., Mar. 7, 1989, "Cellular Pager".

Primary Examiner—Reinhard J. Eisenzopf
Assistant Examiner—Edward Urban
Attorney, Agent, or Firm—Flehr, Hohbach, Test, Albritton & Herbert

[57] ABSTRACT

A compact and unitary cellular/pager. The cellular/pager includes a cellular antenna for receiving UHF cellular and paging signals. The cellular/pager also includes a VHF paging antenna. Every paging signal is sent to a paging receiver. The paging receiver uses the same circuitry to process either the UHF or VHF page. This is accomplished by setting a voltage controlled oscillator (VCO) to one of two frequency ranges. The chosen frequency is either added or subtracted to the incoming signal in order to match a constant intermediate frequency. The resultant signal is demodulated and a bit rate is selected by a decoder, under the control of a microprocessor. Therefore, the paging receiver can choose a band, a channel and a bit rate. Cellular signals are sent to a cellular block. Cellular location information is utilized by the cellular/pager to form an internally updated roaming pager. That is, the cellular location information is automatically conveyed by the cellular block, under the control of the microprocessor, to a paging service. The paging service then knows the location of the paging receiver, consequently the paging service can direct the pager to await for a page at a single frequency, thereby eliminating frequency scanning by the pager or manual updates by the user.

1 Claim, 4 Drawing Sheets

U.S. PATENT DOCUMENTS

| | | | |
|---|---|---|---|
| 4,403,212 | 9/1983 | Masaki | 340/311.1 |
| 4,408,099 | 10/1983 | Ishii | 179/2 EC |
| 4,419,765 | 12/1983 | Wycoff | 455/36 |
| 4,431,991 | 2/1984 | Bailey et al. | 340/825.52 |
| 4,434,504 | 2/1984 | Fredrickson | 455/32 |
| 4,434,506 | 2/1984 | Fujiwara | 455/53 |
| 4,464,638 | 8/1984 | Crowley | 331/1 A |
| 4,490,579 | 12/1984 | Godoshian | 179/2 EC |
| 4,556,760 | 12/1985 | Goldman | 179/2 EB |
| 4,577,060 | 3/1986 | Webb et al. | 179/2 EC |
| 4,597,104 | 6/1986 | Ohki | 455/32 |
| 4,644,347 | 2/1987 | Lucas | 340/825.04 |
| 4,734,694 | 3/1988 | Umetsu | 340/825.44 |
| 4,736,171 | 4/1988 | Minarik | 455/150.1 |
| 4,747,122 | 5/1988 | Bhagar et al. | 379/57 |
| 4,775,999 | 10/1988 | Williams | 379/57 |
| 4,849,750 | 7/1989 | Andros et al. | 340/825.44 |
| 5,054,052 | 10/1991 | Nonami | 455/343 |

CELLULAR TELEPHONE WITH PAGER

BRIEF DESCRIPTION OF THE INVENTION

The present invention relates to an improved cellular telephone. More particularly, it relates to a compact apparatus which includes a cellular telephone and a mobile pager; the apparatus simultaneously utilizes features of the mobile pager and cellular telephone.

BACKGROUND OF THE INVENTION

Cellular telephones are well known in the art. Similarly, mobile pagers are well known in the art. While each art has advanced to a sophisticated level, there are still a number of shortcomings associated with each.

In relation to mobile pagers, a number of problems may arise. First, while a mobile paging unit may be reached almost anywhere in the country, that is obtain a signal, the pager itself does not know where it is located. Thus, to insure that it will be reached, the pager scans multiple frequencies to search for a signal. This scanning of multiple frequencies consumes excess energy.

Mobile pagers with national access capability operate at approximately 150 MHz. However, this frequency range is becoming overcrowded, as a result, pagers are beginning to utilize a 931 MHz frequency. These two frequency ranges are in separate bands and therefore require separate processing circuitry. Thus, if a pager is to utilize both bands, it requires additional circuitry which makes the pager more expensive and bulky.

Another problem related to mobile pagers relates to the inability of a user to identify the paging party by merely looking at the telephone number on the display.

There are also a number of problems associated with cellular telephone technology. First, cellular telephones are difficult to program to achieve particularized functions. Next, they do not provide online help.

To this juncture, mobile pagers and cellular telephones have been utilized concurrently, but never in a compact unitary package. A difficulty preventing such a combination relates to signal processing of the two types of signals. Cellular telephones operate at 800 to 900 MHz while mobile pagers operate at a frequency as low as 150 MHz.

OBJECTS AND SUMMARY OF THE INVENTION

It is a general object of the present invention to combine cellular telephone and mobile pager assemblies into a compact unitary apparatus.

It is a more particular object of the present invention to provide means for processing both cellular and mobile pager signals in the same apparatus.

It is another object of the present invention to provide a mobile pager which is cognizant of its physical location, thereby eliminating scanning, thus serving to conserve energy.

It is another object of the present invention to provide a pager which utilizes one set of circuitry to process the 150 MHz and 931 MHz paging frequencies.

It is still another object of the present invention to provide a pager which includes text information which may be used in conjunction with the number provided by an incoming page.

It is a more particular object of the present invention to provide a mobile pager and cellular telephone which can automatically dial the actual number received from a mobile pager regardless of the area code from which the cellular telephone is dialing.

It is yet another object of the present invention to provide a cellular telephone which may be programmed utilizing an interface with a personal computer.

Another object of the present invention is to provide a cellular telephone with on-line help.

These and other objects are achieved by a compact and unitary cellular/pager. The cellular/pager includes a cellular antenna for receiving UHF cellular and paging signals. The cellular/pager also includes a VHF paging antenna. Every paging signal is sent to a paging receiver. The paging receiver uses the same circuitry to process either the UHF or VHF page. This is accomplished by setting a voltage controlled oscillator (VCO) to one of two frequency ranges. The chosen frequency is either added or subtracted to the incoming signal in order to match a constant intermediate frequency. The resultant signal is demodulated and a bit rate is selected by a decoder, under the control of a microprocessor. Therefore, the paging receiver can choose a band, a channel and a bit rate. Cellular signals are sent to a cellular block which includes a transmit section with two synthesizers controlled by a single set of instructions from the microprocessor. Cellular location information is utilized by the cellular/pager to form an internally updated roaming pager. That is, the cellular location information is automatically conveyed by the cellular block, under the control of the microprocessor, to a paging service. The paging service then knows the location of the paging receiver, consequently the paging service can direct the pager to await for a page at a single frequency, thereby eliminating frequency scanning by the pager and manual updates by the user. The cellular/pager includes a serial port to facilitate data entry. It also includes context-sensitive on-line help for the user of the cellular/pager.

BRIEF DESCRIPTION OF THE DRAWINGS

Other objects and advantages of the invention will become apparent upon reading the following detailed description and upon reference to the drawings, in which.

DETAILED DESCRIPTION OF THE INVENTION

Figure 1:
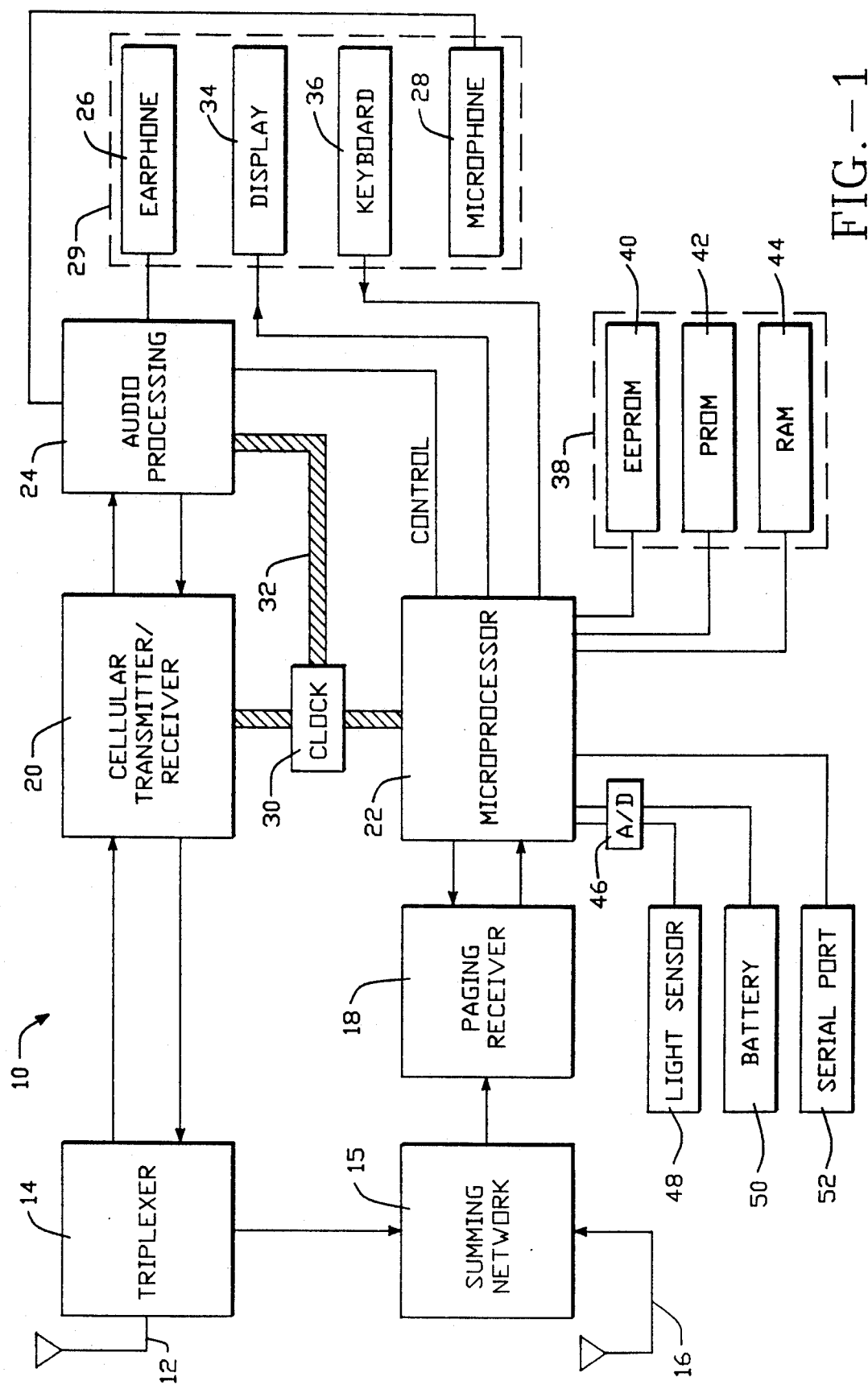
FIG. 1 is a block diagram of a preferred embodiment of a cellular telephone with a pager, in accordance with the present invention.

Turning now to the drawings, wherein like components are designated by like reference numerals in the various figures, attention is initially directed to FIG. 1. Depicted therein, in block format, is a cellular telephone with a pager (cellular/pager) 10. The cellular/pager 10 includes a cellular/pager antenna 12 which is coupled to a triplexer 14. Triplexer 14 is coupled to summing network 15 and cellular transmitter/receiver block (cellular block) 20. A VHF paging antenna 16 is also coupled to summing network 15. The resultant signal from the summing network 15 is conveyed to paging receiver 18 which communicates with the microprocessor 22.

Returning to cellular block 20, signals from cellular block 20 are conveyed to audio processor 24. Audio processor 24 controls the earphone 26 and the microphone 28, which are positioned on the face 29 of the cellular/pager 10. The audio processor 24 is synchronized by clock 30 and I²C bus 32 which operates between the cellular block 20 and the microprocessor 22.

The microprocessor 22 also controls the display 34 and keyboard 36 on face 29 of the cellular/pager 10. The microprocessor also operates in conjunction with memory bank 38, including EEPROM 40, PROM 42, and RAM 44. An analog to digital converter 46 digitizes the analog input from light sensor 48 and battery 50. The microprocessor is also attached to a serial port 52.

Figure 2:
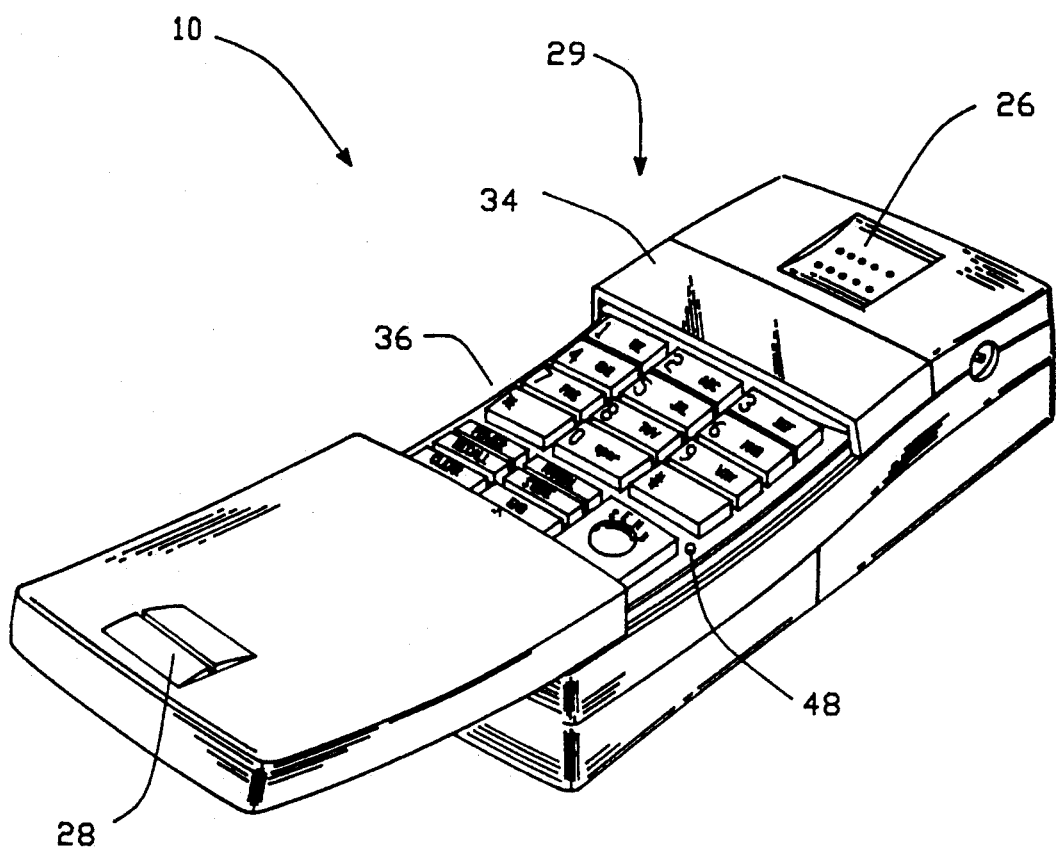
FIG. 2 is a perspective view of a cellular telephone with a pager in a compact unitary housing in accordance with the present invention.

Turning to FIG. 2, the external portion of cellular/pager 10 is depicted. Specifically, face 29 includes earphone 26, display 34, keypad 36 and microphone 28.

Having provided an overview of the cellular/pager 10 of the present invention, attention focuses upon some of the details of the apparatus. Cellular antenna 12 is connected to triplexer 14. The cellular antenna 12 is used for cellular reception and transmission. However, it is also used to receive pages at 931 MHz.

The triplexer uses a band pass filter to separate the cellular radio transmit signal and another band pass filter to separate its receive signal. As a result, the transmitter and receiver can run simultaneously. This aspect of the triplexer is essentially normal duplexer operation for a two port device.

In order to accommodate the paging signal, the triplexer also employs a third band pass filter to separate the 931 MHz paging signal. Thus, an additional port is involved which potentially upsets the normal operation of the two port duplexer. To prevent such a disruption, the band pass filter for the 931 MHz paging signal has a high impedance at the transmit frequency, such that power is not shunted into the receivers when the transmitter from cellular block 20 is operating.

Figure 3:
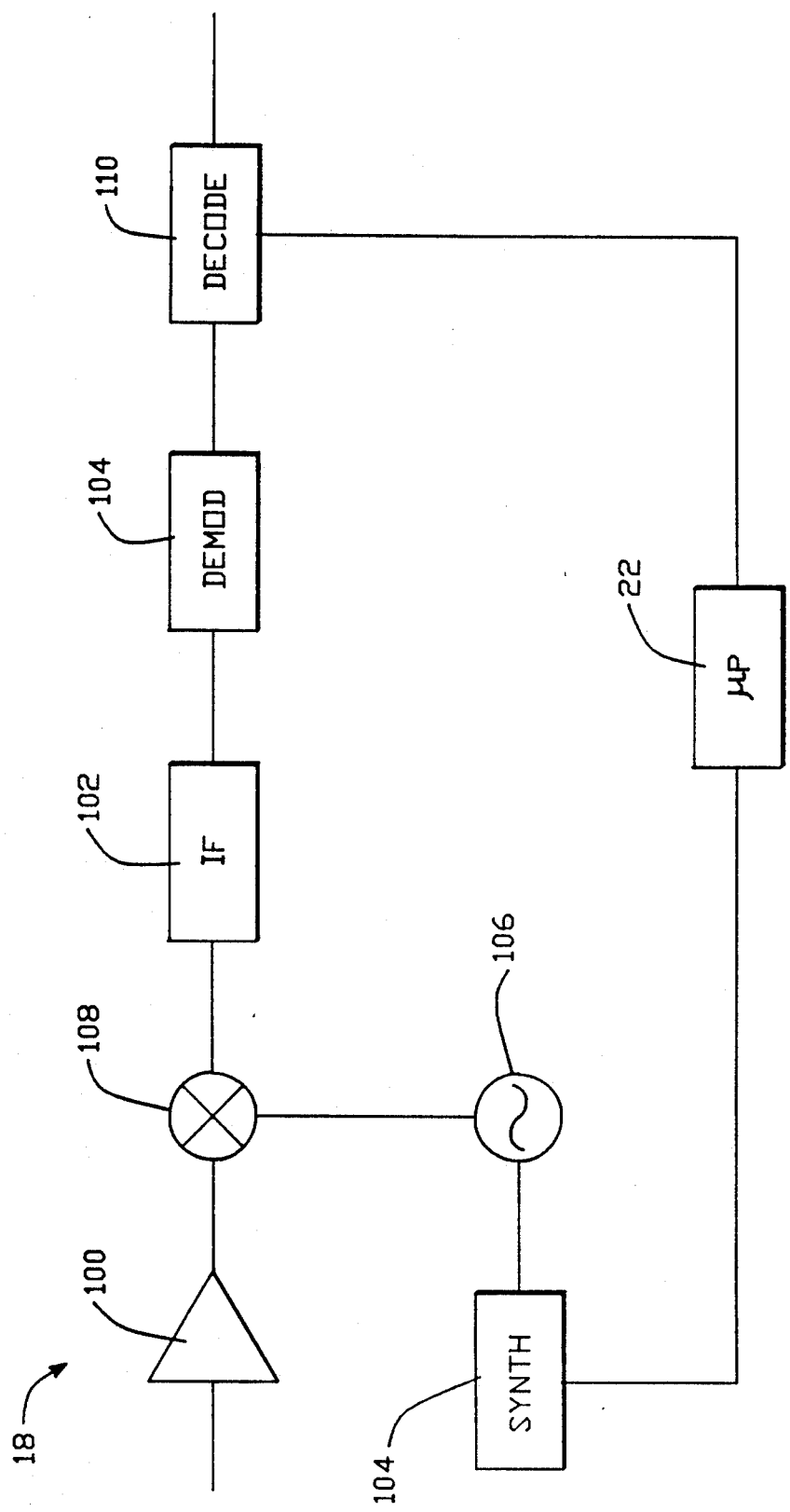
FIG. 3 is a detailed block diagram of the paging receiver of FIG. 1.

Turning now to FIG. 3, a detailed block diagram of the paging receiver 18 is provided. The paging receiver 18 can select both its band and its channel. It operates in the 150 to 160 MHz and 931 to 932 Mhz bands. It is difficult to accommodate these two vastly different frequencies. Normally, separate circuitry would be required to process each signal. The additional circuitry is expensive, consumes extra energy, and results in a bulkier device.

These problems are solved with the present invention, as one set of circuitry is utilized to process both bands. The signal from summing network 15 is fed to paging receiver 18. As shown in FIG. 3, the signal proceeds through low noise amplifier 100, the output is then fed through mixer 108 to intermediate frequency chip 102.

The IF chip 102 is maintained at 470 MHz. To obtain the desired frequencies, the VCO 106, via synthesizer 104, is set to two ranges. The first range is 460 to 470 MHz while the second range is 310 to 320 MHz. If one desires to receive a signal at 930 MHz, the first range is subtracted from the received signal to match the intermediate frequency; that is, the input signal minus the VCO 106 will equal 470 MHz, the setting of the IF chip 102. Conversely, if one desires to receive a signal at 150 MHz, the second range is added to match the intermediate frequency; that is the input signal plus the VCO 106 will equal 470 MHz, as maintained on the IF chip 102.

This configuration has a number of advantages. First, only one local oscillator is required. Next, only one synthesizer is required. Finally, it eliminates the need for an RF switch that consumes excessive power and space. Thus, one set of circuitry processes signals at both bands, facilitating a compact, unitary package for the cellular/pager 10.

After a range, and thus a band is selected, the signal is demodulated at block 104 and conveyed to decode chip 110. The decoder 110 may be a Phillips PCA 5000T chip or any other decoder chip. The decoder adjusts for the proper bit rate. The standard bit rate is 512 bits per second. It is desirable to accommodate a rate of 1200 bits per second. Either bit rate may be accommodated by the decoder 110 as directed by the microprocessor 22.

In sum, the pager receiver 18 of the present invention allows one to select the band (900 or 150 MHz), to select the channel, and the bit rate.

Figure 4:
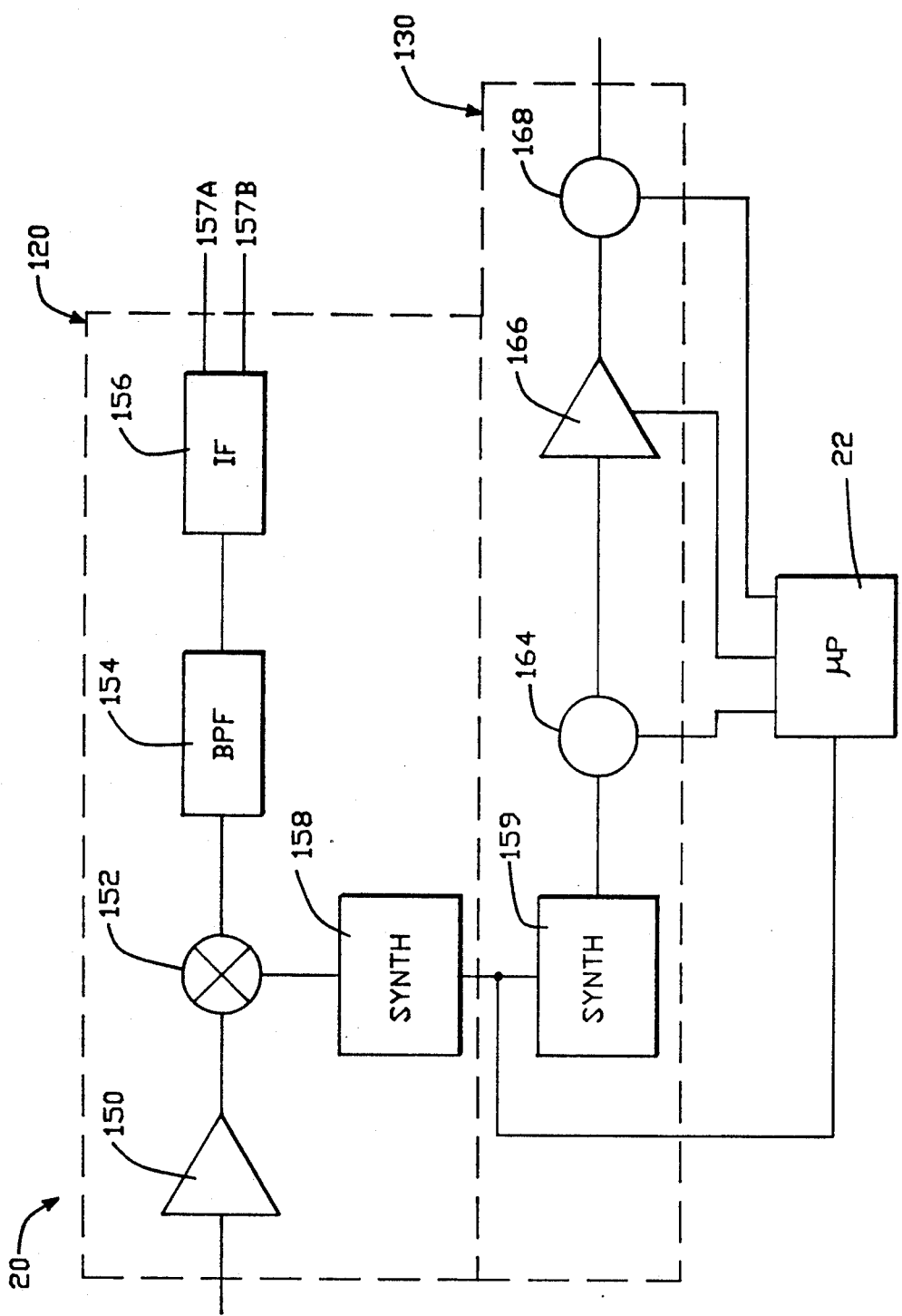
FIG. 4 is a detailed block diagram of the cellular transmitter/receiver block of FIG. 1.

FIG. 4 discloses the novel aspects of the cellular transmitter/receiver 20. The cellular block 20 employs a cellular data processor chip; a Phillips UMA 1000 chip is suitable. The receiver section 120 includes a low noise amplifier 150 coupled to the triplexer 14. The amplified signal is mixed with the signal from synthesizer 158 through mixer 152. The signal from the mixer proceeds to band pass filter 154 which isolates a 45 MHz signal. From band pass filter 154, the 45 MHz signal is sent to an intermediate frequency receiver 156 which sends demodulated data over line 157A and a signal strength signal over line 157B.

The transmit section 130 of the cellular data processor 20 includes an additional synthesizer 159. Synthesizer 158 and synthesizer 159 are treated as a single synthesizer by the microprocessor 22, receiving and transmitting identical information through a single lead. When the microprocessor 22 invokes a certain channel, both the receiver 120 and transmitter 130 will be switched. There is no need to communicate with two synthesizers since the microprocessor 22 treats the two synthesizers 158 and 159 as a single synthesizer.

The second synthesizer 159 is modulated with transmitter data and thus eliminates the need for phase modulators, which consume power and are expensive. While expensive circuitry is avoided and energy is saved, additional control is not reqired from the microprocessor 22, since the microprocessor 22 is essentially communicating with a single synthesizer.

The output from synthesizer 159 runs through switch 164 which turns off the signal when the cellular/pager 10 is not transmitting. Switch 164 is under the control of the microprocessor 22. When the switch 164 is open, the signal runs to amplifier 166 which includes variable power control; amplifier 166 is also under the control of the microprocessor 22.

The output goes through power sensor 168 which is also coupled to the microprocessor 22, which utilizes a look-up table to insure that the proper voltage level is present. After proceeding through the power sensor, the signal goes to the transmit section of the triplexer 14.

The microprocessor serves a number of roles in relation to cellular data processing. It controls the cellular radio transmitter and receiver, it also controls the tuning, power levels, and toggles the transmitter on and off. The microprocessor is also used to determine the proper channel and whether a channel is idle. The microprocessor 22 also sends data out over the transmitter 130 to establish a call and to register its location, as is known in the art.

From the cellular processor of FIG. 4, the resultant signal is sent to the audio processor 24. The audio processor may be a Phillips NE 5750/5751 audio processor. The audio processor 24 controls the audio processing circuits which process the audio signal in accordance with cellular standards. The Audio processor 24 is coupled to earphone 26 and microphone 28, which are known in the art. The display 34 and keyboard 36 on the face 29 of the cellular/pager 10 are also of the type which are known in the art. A suitable display 34 and keyboard 36 are depicted in FIG. 4. The display 34 and keyboard 36 are coupled to the microprocessor 22.

The microprocessor 22 may be a Signetics 80C552 chip. It controls memory bank 38 which includes EEPROM 40. EEPROM 40 may be a (2K×8) chip. The microprocessor 22 is also coupled to PROM 42 which may be a (64K×8) chip and RAM 44 which may be a (2K×8) chip. There is also memory in the microprocessor which contains a program, there is also active memory for storing information such as scratch pad, key stroke, and, active channel information.

An analog to digital converter 46 permits interface between the microprocessor 22 and light sensor 48 and battery 50.

The light sensor 48 may be positioned on the face 29 of the cellular/pager 10, as seen in FIG. 2, to sense ambient light. The microprocessor can then be utilized to illuminate the keyboard 36 in response to the ambient light. The serial port 52 permits an interface with an external device to allow programming of the cellular/pager 10. Thus, in addition to an ability to program the cellular/pager from the keypad 36, a separate personal computer, with its extended keypad, may be used to create a directory or procedures which may be downloaded from the personal computer, through the serial port 52, into the microprocessor 22 and then into memory bank 38.

The timing of the microprocessor 22 is governed by clock 30 which communicates with the microprocessor by means of I²C bus 32; the clock may be a Phillips PCF8573 chip. Preferably, the clock 30 includes a wake up pin and includes its own battery. A Phillips PCF8573 chip is suitable for this purpose. The I²C bus 32 is utilized between the clock 30 and cellular data block 20 and audio processor 24.

The described hardware operates at a number of power levels. In the power down mode, all active devices are in an inactive state, except for the microprocessor 22 which maintains a low level power state. In the pager mode, the microprocessor 22 is maintained at a higher power state while the paging receiver 18 is active, thus, the pager of the cellular/pager 10 may receive a page. In the standby mode the cellular block 20 is active. Thus, the cellular receiver 120 is active and the cellular transmitter 130 transmits locational information every few minutes. Finally, in the call-mode, essentially all the circuitry is active.

In the pager mode, a page may be received through either the cellular antenna 12 or the paging antenna 16. As previously described, the incoming page is processed and reaches the microprocessor 22. The microprocessor 22 may activate an indicator which may be an audible tone or a vibrating mechanism.

The microprocessor 22 compares the incoming page to a stored directory of names and telephone numbers. If the directory finds a match for the incoming page number, the information from the directory is conveyed to display 34. This information may include the paging party's name and telephone number, for instance. If after viewing the directory information on the display 34, the user of the cellular/pager 10 decides to call the displayed number, a button on keypad 36 may be pushed which will cause the information from the directory to be automatically dialed, in accordance with prior art techniques.

This automatic dialing will include the area code, thus in urban areas with multiple area codes a user need not worry about remembering the area code of the caller, nor worry about the area code from which the call is being made. That is, if the cellular/pager is roaming from one area code to the next, the local cell will have this information. The area code in the directory will be utilized as necessary, depending upon the cell from which the call is being made.

If a match is not found within the directory, the number is sent to display 34. In this case, if the user desires to dial the displayed number, the number may be dialed manually.

In the standby mode the cellular block 20 is active and therefore a cellular phone call may be received. Part of the operation of the cellular block 20 includes intermittent transmissions by the cellular transmitter 130. Based upon these transmissions, the local cell returns to the cellular receiver 120 useful information defining the location of the cellular/pager 10. This information may be used by the microprocessor 22 and the pager receiver. For instance, once the information defining the location is received, a telephone call may be made to the local paging system. The location information received from the cell may be transmitted to the paging system. With this information, the paging system can inform the cellular/pager 10 to await for a page at a specific frequency. Thus, the pager receiver 18 does not have to scan multiple frequencies.

More specifically, in the standby mode, the cellular data block 20 receives and transmits signals. The microprocessor 22 interprets those signals to determine whether it has gone to a different cellular region. Based upon that information, the microprocessor 22 will then direct the cellular data processor 20 to call a 1-800 number and inform the paging system of the cellular/pager's 10 location. The paging system will instruct the cellular/pager 10 to tune to a different frequency, a different path code and different receiver coordinates. Afterwards, the paging system will send out a page to confirm to the cellular/pager 10 that it has in fact executed all of those instructions. All of this activity is invisible to the user.

Thus, by combining the cellular block 20 with the paging receiver 18, the receiver operates more efficiently since it does not have to scan frequencies. Similarly, the user of the pager does not have to continuously call the paging service to provide updated location information—this is done automatically.

When the cellular/pager 10 is in the standby mode one may invoke on line help. This information is stored in memory bank 38. Depending upon what activity the user is presently doing, the microprocessor 22 fetches the proper help information stored in memory bank 38. Thus, a different help message is provided depending upon what the user is doing. For instance, if the user is storing a phone number, the microprocessor 22 will fetch information regarding storing phone numbers.

Thus, is apparent that there has been provided, in accordance with the invention, a programmable cellular telephone with a pager which fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and scope of the appended claims.

What is claimed is:

1. An apparatus for receiving VHF and UHF paging signals and for receiving and transmitting cellular signals, comprising:
   (A) first means for receiving VHF paging signals;
   (B) second means for receiving and transmitting UHF cellular signals, said second means including a triplexer and a cellular block said second means further including means for receiving UHF paging signals;
   (C) a microprocessor;
   (D) a summing network, coupled to said first means and said second means, said summing network summing said VHF paging signals from said first means and said UHF paging signals from said second means;
   (E) a paging receiver coupled to said summing network, said paging receiver including,
      (1) a single circuit for processing said VHF paging signals and said UHF paging signals, said circuit including a local oscillator controlled by said microprocessor, said local oscillator being set to either a first frequency selected from a first frequency range or a second frequency selected from a second frequency range, said first frequency being added to said VHF paging signals and said second frequency being subtracted from said UHF paging signals;
      (2) a demodulator;
      (3) a decoder, said microprocessor controlling said decoder and said local oscillator, such that said apparatus may select a band, channel and bit rate;
   (F) means for processing and utilizing said UHF cellular signal to determine the location of said apparatus, whereby said second means for receiving and transmitting said UHF cellular signals are utilized to provide said location to a paging system, said paging system providing a paging signal, received by said paging receiver, defining a single frequency for said paging receiver to tune;
   (G) an audio processor coupled to a microphone and an earphone;
   (H) a keyboard coupled to said microprocessor;
   (I) a display coupled to said microprocessor;
   (J) a serial port coupled to said microprocessor;
   (K) memory coupled to said microprocessor;
   (L) a program stored in said memory whereby said microprocessor conveys information from said program on said display; and
   (M) a compact housing enclosing (C) through (L).

* * * * *